(12) United States Patent
Koul et al.

(10) Patent No.: US 10,313,845 B2
(45) Date of Patent: Jun. 4, 2019

(54) PROACTIVE SPEECH DETECTION AND ALERTING

(71) Applicant: Microsoft Technology Licensing, LLC, Redmond, WA (US)

(72) Inventors: Anirudh Koul, San Jose, CA (US); Venkata Naga Vijaya Swetha Machanavajhala, Bellevue, WA (US); Stéphane Morichère-Matte, Vancouver (CA); David Dai Wei Zhang, Calgary (CA); Anass Al-Wohoush, Montreal (CA); Jan Ervin Mickel Takata Clarin, Airdrie (CA); Sheng-Ting Lin, Vancouver (CA); Sitthinon Jinaphant, Vancouver (CA); Shery Sharonjit Sumal, Surrey (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/615,607

(22) Filed: Jun. 6, 2017

(65) Prior Publication Data

US 2018/0352390 A1 Dec. 6, 2018

(51) Int. Cl.
*G10L 15/00* (2013.01)
*H04W 4/12* (2009.01)
(Continued)

(52) U.S. Cl.
CPC .............. *H04W 4/12* (2013.01); *G10L 15/08* (2013.01); *H04M 1/72538* (2013.01); *H04M 2250/74* (2013.01)

(58) Field of Classification Search
USPC .................................. 704/231–257, 270–275
See application file for complete search history.

(56) References Cited

U.S. PATENT DOCUMENTS 6,934,376 B1 8/2005 McLaughlin et al.
2006/0265224 A1* 11/2006 Bennett ......................... 704/246
(Continued)

OTHER PUBLICATIONS

"Invention for deaf community accurately picks up the direction of noise or sound and translates it into a vibration", http://www.imeche.org/news/news-article/sri-lankan-team-wins-imeche-asia-pacific-design-competition, Published on: May 26, 2016, 13 pages.
(Continued)

*Primary Examiner* — Jesse S Pullias

(57) ABSTRACT

Non-limiting examples of the present disclosure describe proactive speech detection on behalf of a user and alerting the user when a specific word, name, etc. is detected. Speech detection is actively executed through a computing device, where the speech detection analyzes spoken utterances in association with a dynamic grammar file stored locally on the computing device. An alert is generated that indicates when a spoken word of the utterances matches a word stored in the dynamic grammar file. The alert may be displayed, for example, through the computing device. The alert provides indication that the spoken word is identified in the spoken utterances. In further examples, a buffered window of the spoken utterances is captured which is associated with a detection of the specific word. A live transcription of the content in the buffered window is generated and provided to a computing device of the user.

20 Claims, 7 Drawing Sheets

(51) Int. Cl.
*G10L 15/08* (2006.01)
*H04M 1/725* (2006.01)

(56) References Cited

U.S. PATENT DOCUMENTS

| | | | |
|---|---|---|---|
| 2007/0263805 A1 | 11/2007 | Mcdonald | |
| 2010/0017203 A1* | 1/2010 | Archibald | G10L 25/78 704/208 |
| 2012/0189129 A1* | 7/2012 | Gabara | H04M 1/72569 381/56 |
| 2012/0191461 A1* | 7/2012 | Lin | G10L 15/22 704/275 |
| 2015/0098018 A1 | 4/2015 | Starling et al. | |
| 2015/0127340 A1* | 5/2015 | Epshteyn | G10L 15/26 704/235 |
| 2015/0302847 A1* | 10/2015 | Yun | G10L 15/02 704/251 |
| 2017/0330585 A1* | 11/2017 | Bostick | G10L 21/10 |

OTHER PUBLICATIONS

"New OtoSense Mobile App Enables Deaf and Hard of Hearing People to See Audio Alerts and Other Sounds on Their Smartphones", http://www.marketwired.com/press-release/new-otosense-mobile-app-enables-deaf-hard-hearing-people-see-audio-alerts-other-sounds-1944795.htm, Published on: Oct. 8, 2014, 3 pages.

Krull, Jeannie, "ND Assistive | Assistive Technology Blog", http://ndipat.org/blog/no-sign-language-interpreter-try-this-app-system/, Published on: Jul. 18, 2013, 4 pages.

"Assistive Devices for People with Hearing, Voice, Speech, or Language Disorders", https://www.nidcd.nih.gov/health/assistive-devices-people-hearing-voice-speech-or-language-disorders, Published on: Dec. 2011, 5 pages.

Macdonald, Fiona, "This Device Could Let Deaf People "Hear" via Their Tongues", http://www.sciencealert.com/this-device-could-let-deaf-people-hear-via-their-tongues, Published on: Jan. 19, 2015, 3 pages.

"Smartwatches", http://www.ndcs.org.uk/family_support/technology_and_products/apps_for_deaf_young_people/apps_for_deaf_young_people/smartwatch_apps.html, Retrieved on: Apr. 11, 2017, 4 pages.

\* cited by examiner

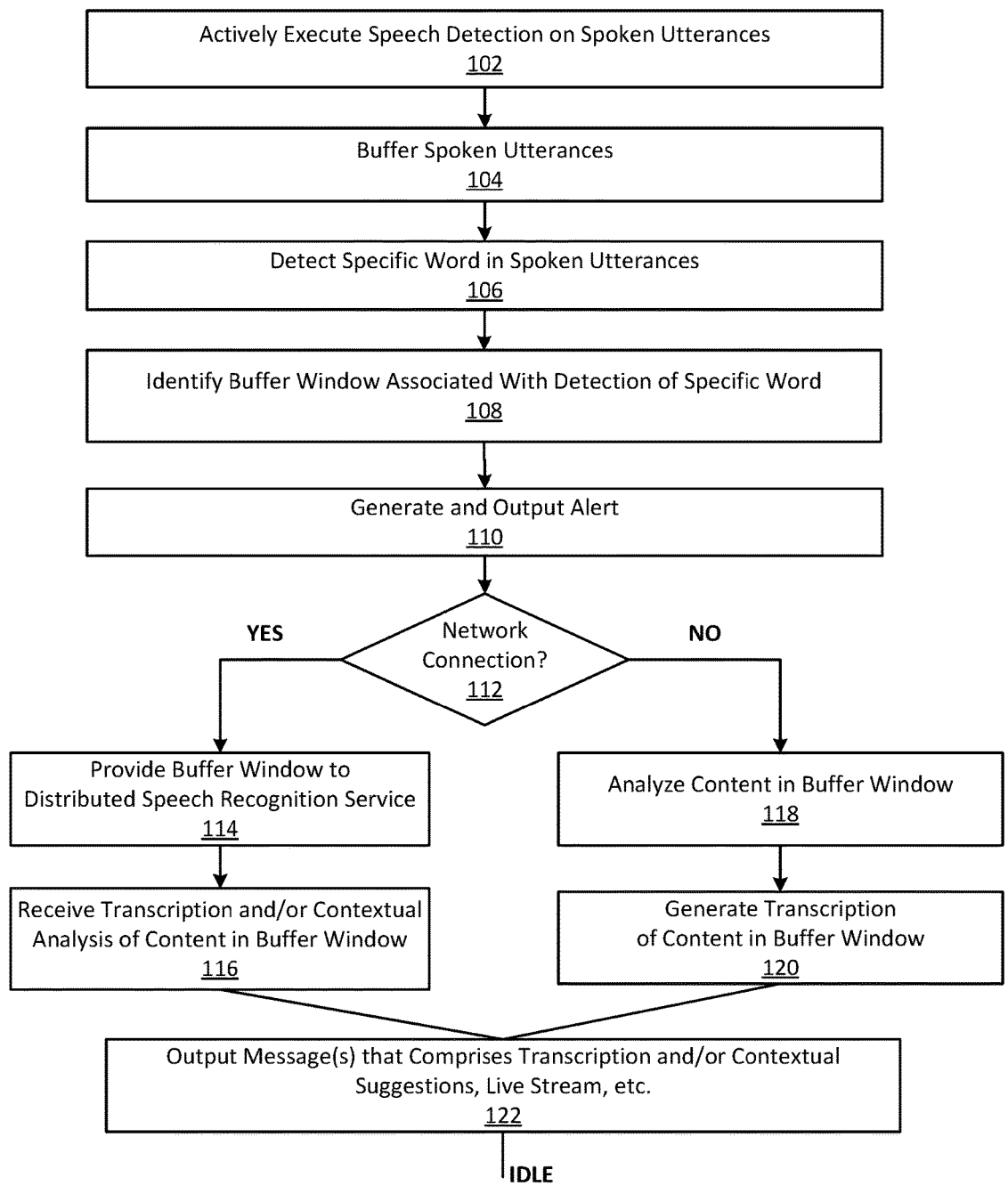

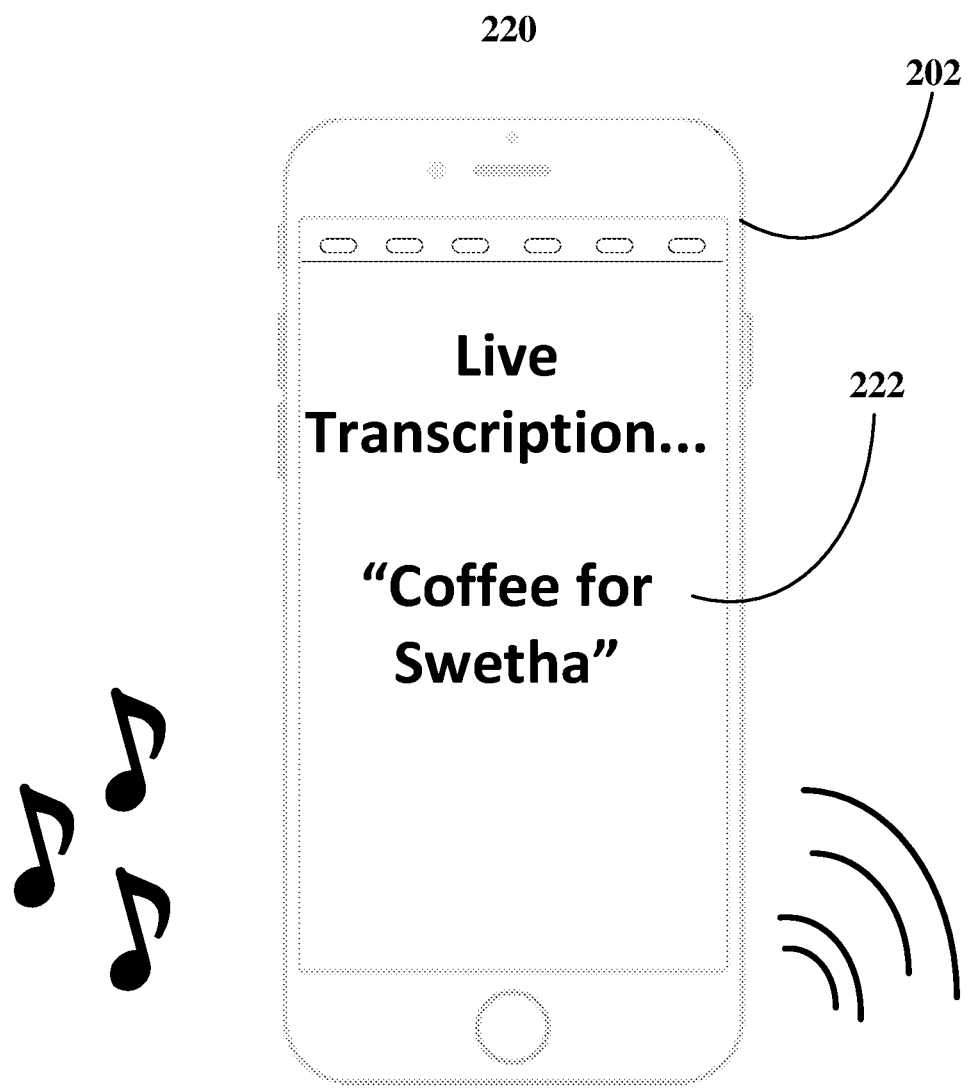

PROACTIVE SPEECH DETECTION AND ALERTING

BACKGROUND

Personal intelligent assistant services (e.g. Alexa®, Siri®, Cortana®, Google Home®) have some preprogrammed hot words which can be recognized to activate a specific service. For example, "Alexa®, what's the weather," may be a trigger for active listening to a user query. However, this technology is limited to examples where a service (e.g. intelligent personal assistant service) is being directly addressed. On any given day, the most common noun heard by a person is usually their name. Apart from their name being called by another person right in front of the person, often the name is called at public address (PA) announcement systems at airport, at restaurants, university lecture rooms, etc., where a person may not be paying immediate attention to the announcement. People who are deaf or hard of hearing see this as huge roadblock in their lives because they either cannot hear or are unable to interpret sounds around them, they are constantly looking for cues to help them recognize their name being called out.

Furthermore, known services for audio recognition (e.g. intelligent personal assistant services) may struggle with name identification. Users of such services understand the limitations where typical intelligent personal assistant services may struggle with identifying user speech for any number of reasons including not being able to interpret user speech, not recognizing a name. For instance, typical intelligent personal assistant services may struggle with non-Western names like "Anirudh" or "Machanavajhala", where most speech recognition systems would never recognize such names.

As such, examples of the present application are directed to the general technical environment related to proactive speech detection on behalf of a user and alerting the user when a specific word, name, etc. is detected.

SUMMARY

Non-limiting examples of the present disclosure describe proactive speech detection on behalf of a user and alerting the user when a specific word, name, etc. is detected. Speech detection is actively executed through a computing device, where the speech detection analyzes spoken utterances in association with a dynamic grammar file stored locally on the computing device. An application/service is configured to enable active listening of sound utterances, for example, based on user consent. Speech detection is used to analyze sound utterances in a proactive manner without requiring the user to initiate a query. The sound utterances may also be buffered, for example, to enhance speech detection as well as efficiently provide context associated with the sound utterances. An alert is generated that indicates when a spoken word of the utterances matches a word stored in the dynamic grammar file. The alert may be displayed, for example, through the computing device or an accessory device connected with the computing device. An exemplary alert provides indication that the spoken word is identified in the spoken utterances. This can assist a user to identify when their name has been called, for example, in a busy restaurant while waiting for a table, food, drink, etc.

In further examples, a buffered window of the spoken utterances is captured that is associated with a detection of the specific word. Content in the buffered window may be analyzed to provide context for how the specific word is being used. A live transcription of the of the content in the buffered window may be generated and provided to a computing device of the user. For instance, in examples where the computing device is connected to the internet through a network connection (e.g. cellular, wireless, hardwired, etc.) an exemplary buffered window of the sound utterances may be provided to a distributed speech recognition service, among other applications/services. This may enable efficient analysis of streaming audio using additional resources of a distributed service while reducing bandwidth needed for active analysis of sound utterances. Other applications/services may be utilized to analyze a context associated with a use of a specific word, for example, to provide messages to the user that comprise contextual suggestions. In other examples, an application/service may be configured to analyze sound utterances locally and provide alerts without requiring a network connection. As such, examples described herein enable alerting (notification) of a user of specific spoken words in cases where the computing device has a network connection and when a computing device is executing locally (without a network connection).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 illustrates an exemplary method related to speech detection and notification with which aspects of the present disclosure may be practiced.

FIGS. 2A and 2B illustrate exemplary processing device views providing examples related to exemplary alerts based on speech detection processing with which aspects of the present disclosure may be practiced.

DETAILED DESCRIPTION

Figure 2A:

Users are in need of enhancements that could make their lives easier. Non-limiting examples of the present disclosure describe proactive speech detection on behalf of a user and alerting the user when a specific word, name, etc. is detected. Examples described herein are configured to notify users when a specific word (e.g. their name) is called out, for example, in a public place. The present disclosure describes logic for application of an active listening system. A computing device may be configured to locally execute speech recognition processing to activate an alert when a specific word is heard in a spoken utterance. In doing so, a dynamic grammar file is locally stored on the computing device. This customization provides better accuracy for speech recognition and bandwidth utilization for an always-on listening system. Since most speech recognition systems have massive models that cannot fit in a device memory, such systems are usually run on cloud servers and may be unable to operate locally on a computing device. Further, recognizing simple words like "William" or "Emma", a computing device needs to constantly keep streaming audio to the server which uses up a lot of bandwidth thereby resulting in huge server bills. To make the entire process of recognizing words (e.g. names, spoken proper nouns) efficient with more accuracy and less bandwidth, an application/service provided herein is configured to adapt speech recognition algorithms to run locally on a computing device. This enhancement could be used by everyone thereby making it an inclusive service that can extend functionality of any application including an operating system (OS) or an intelligent personal assistant service. Developers can use this pipeline to activate applications/gadgets utilizing microphones with custom activation commands without the need to connect to the internet.

Furthermore, examples described herein can utilize distributed services of a platform, accessed via network connection, to enhance alerts that are provided to users. Signal data can be collected and analyzed about a user, location (e.g. geo-locations data), network connections, other applications/services of a platform, etc. to enhance analysis of spoken utterances. For instance, a context in which a specific word is used in a spoken utterance can be determined and provided to a user through a customized alert/notification. This is extremely useful for users in cases where they may not have heard an initial calling of their name or a context in which their name was being used, emergency situations, etc. Another instance of usefulness is a case where a user is hearing-impaired and may have difficulty recognizing specific words in a crowded, public place. Buffering processing operations can be applied to filter out unwanted non-speech noise, silence, enhance speech and capture intervals of spoken utterances for contextual evaluation.

Moreover, alerts can be customized for the user to provide notification and/or context in which their name was called. Alerts may comprise text messages, vibrations, audio output, images, transcriptions, live streams, and contextual suggestions, among other examples. Exemplary alerts may be proactively provided to a computing device of a user and/or an accessory device connected with the computing device. Further examples can extend to relaying notifications to artificial intelligence (AI) components including chatbots and/or robots.

Accordingly, the present disclosure provides a plurality of technical advantages including but not limited to: real-time generation of proactive alerts/notifications for spoken words, persisting, in a storage (e.g. locally on a computing device) dynamic grammar files for enhanced speech detection processing in a lightweight manner, extensibility to integrate functionality described herein in different applications/services including incorporating distributed services (accessed via a network connection) for targeted enhancement of speech recognition processing, configurations that enable more efficient operation of processing devices (e.g., saving computing cycles/computing resources/reduced battery consumption) in speech detection processing and alert generation/output as well as improving user interaction with computing devices and applications/services for generation and output of proactive alerts/notifications, among other examples.

FIG. 1 illustrates an exemplary method 100 related to speech detection and notification with which aspects of the present disclosure may be practiced. As an example, method 100 may be executed by an exemplary processing device and/or system such as those shown in FIGS. 3-5. In examples, method 100 may execute on a device comprising at least one processor configured to store and execute operations, programs or instructions. Operations performed in method 100 may correspond to operations executed by a system and/or service that execute computer programs, application programming interfaces (APIs), neural networks or machine-learning processing, among other examples. As an example, processing operations executed in method 100 may be performed by one or more hardware components. In another example, processing operations executed in method 100 may be performed by one or more software components. In some examples, processing operations described in method 100 may be executed by one or more applications/services associated with a web service that has access to a plurality of application/services, devices, knowledge resources, etc. Processing operations described in method 100 may be implemented by one or more components connected over a distributed network, where a suite of applications/services may interface with an exemplary application through a distributed service accessed via network connection. Processing operations described herein are repeatable when new sound utterances are detected where exemplary alerts may be continuously provided to users.

Method 100 begins at processing operation 102, where speech detection processing is actively executed on spoken utterances. Speech detection processing operations executed herein are known to one skilled in the art where speech recognition components or modules are utilized to execute speech recognition processing. In examples, an application/service may be configured to execute active listening for spoken utterances. As an exemplary application/service is actively listening for specific words, it is understood that processing operations related to active speech detection are executed in coordination with user consent and applicable privacy laws. In processing operation 102, Speech detection is used to analyze sound utterances in a proactive manner without requiring the user to initiate a query or request the user to initiate active listening. In some alternate examples, an application/service may be configured to enable users to toggle control over initiation of active speech detection.

Processing operation 102 is configured to utilize a dynamic grammar file that is generated from a dictionary created by (or on behalf of) a user. Operations for creation and management of dictionaries and dynamic grammar files may be referenced in the description of processing operation 102 to assist with understanding. However, it should be recognized that processing operations for creation and management of dynamic grammar files may be executed asynchronously to speech detection processing described herein. An exemplary application/service is configured to enable a user to build a dictionary to provide words or phrases that a speech detection processing component (executing in processing operation 102) can utilize to identify specific words or phrases in spoken utterances. For instance, an exemplary application/service is configured to provide a user interface for a user to create a dictionary of words/phrases that can be used for speech detection purposes. In one example, the dictionary is a name dictionary, where the application/service is configured to accept proper nouns, names, first names, last names, nicknames, etc. This makes the system capable of recognizing specific instances of names and creates a more efficient and lightweight solution, as compared to employing larger dictionary files, to analyze spoken utterances. Creation of an exemplary dictionary (and/or dynamic grammar file) may occur locally on a computing device or through a distributed service, for example, which may be synchronized with a computing device (e.g. at a later point in time).

A dynamic grammar file is generated for speech recognition programs, which enables recognition of specific names entered by the user. An exemplary dynamic grammar file may be created from words/names/phrases entered into the dictionary (e.g. name dictionary). Processing operations for creation of a dynamic grammar file is known to one skilled in the art. In one example, a user may provide, when creating a dictionary of words/phrases, a spoken utterance for a specific word, name, phrase, etc., which can be used for speech detection purposes. In another instance, the user may enter text input for a specific word, name, phrase, which may be further analyzed to identify phonemes associated with the specific word/name/phrase. An exemplary dynamic grammar file may be stored locally in a storage/memory of a computing device. In another example, the dynamic grammar file may be stored on a distributed storage that is associated with a distributed service, where speech detection processing may occur using a distributed system configuration (e.g. connecting with a computing device over a network connection). The dynamic grammar file may be updatable, where a user can add/remove words/phrases. In some instances, an initial dynamic grammar file can be created on behalf of the user, for example, where an exemplary application/service can utilize user signal data (e.g. from a user account of the user or computing devices of the user) to identify a name of a user, nickname, etc. Having such a small dynamic grammar file makes system light enough to run on a mobile client computing device. This lightweight processing also reduces the battery consumption for subsequent processing steps.

The application/service may utilize components of a computing device (e.g. microphone(s), processors, memory, etc.) to capture sound utterances in proximity to the computing device. Processing operation 102 may comprise launching or activation of a speech detection component/module that actively listens for sound utterance (e.g. audio signals). Processing operation 102 may further comprise filtering operations, where the application/service is configured to filter off silence and non-speech noise, for example, to isolate speech signals. In some instances, processing operation 102 may comprise operations that focus in on and enhance speech signals, for example, to best evaluate phonemes present in the speech signals.

Flow may proceed to processing operation 104, where spoken utterances may be buffered. The spoken utterances are buffered (processing operation 104) through a moving window buffer that continuously tracks intervals of the sound utterances. Buffers and buffer windows, used for tracking signal data including sound utterances, are known to one skilled in the field of art. In examples, an exemplary application/service is configured to keep a moving buffer window that captures intervals of the spoken utterances, for example, for a predetermined length of time (e.g. 15 seconds, 30 seconds, 60 seconds, etc.). An exemplary moving buffer window is customizable and may be modified by developers and users (in some instances). Moreover, an exemplary buffer may be updated one or more times in a given time period. In one example, the buffer is updated once every second. However, buffering may vary based on developer configurations and available network bandwidth. Examples described herein provide a custom speech recognition program (using the dynamic grammar files) that is run on the sound buffer at a periodic interval (e.g. every second) to check if a users' name has been called. Buffering of sound utterances may also be customizable. In one instance, buffering of sound utterances begins as soon as an exemplary application/service is launched. In another instance, buffer collection initiates after receiving an indication from a speech detection component, for example, where the indication identifies that speech is being received.

At processing operation 106, content of an exemplary moving buffer window is analyzed, for example, to detect a specific word within a spoken utterance. Speech detection processing, executed in processing operation 102, may utilize a created dynamic grammar file to evaluate phonemes present in spoken utterances. Spoken utterances, passing through the moving buffer window, may be analyzed using the dynamic grammar file. For instance, speech detection processing at processing operation 106 may match phonemes of a spoken utterance to that of specific words or utterances in a dynamic grammar file. Processing operation 106 determines whether phonemes that are uttered in speech sound similar to a name/word/phrase stored in the dynamic grammar file. Internally, the dynamic grammar raises the probability of names being recognized if phonemes are uttered in speech which sound similar to these names. In at least one example, a threshold evaluation (e.g. probability based) is used to determine a matching between a spoken word (of the spoken utterances) and that of a specific, word/name/phrase, etc. in the dynamic grammar file.

In examples where one or more specific words in the spoken utterances are detected, flow of method 100 may proceed to processing operation 108, where a specific buffer window is identified. In some instances (e.g. where no network connection exists), an exemplary alert may comprise an indication that a specific word/name is called out/mentioned without further contextual analysis of a use of the specific word/name. In that case, flow of method 100 may proceed directly to processing operation 110. In examples where processing operation 108 is executed, an exemplary buffered window may correspond with an interval of the sounds utterances that is associated with a detection of the spoken word. For instance, an interval may be predetermined (e.g. 15 seconds, 30 seconds) relative to the point in which the specific word, name, etc. is detected. In one example, an exemplary buffer window may comprise sound utterances before the recitation of the specific word as well as afterwards. For instance, 15 seconds of sound utterances before the recitation of the specific word and 15 seconds after the recitation of the specific word may be captured for contextual analysis. It is to be understood that an exemplary application/service may be configured to customize an interval of the buffer window.

At processing operation 110, an exemplary alert is generated and output. Generation and output of an exemplary alert may be separate processing operations but are described as one step for ease of description. An exemplary alert indicates that the spoken word is identified in the spoken utterances and the alert may be proactively provided for a user without the user querying for or requesting the alert. The application/service may be configured to automatically generate the alert based on a detection (processing operation 106) of a specific word/name/phrase etc. in the spoken utterances. Non-limiting examples of exemplary alerts are provided in FIGS. 2A and 2B. One or more different alerts may be generated by an exemplary application/service. Generation of an alert may vary on a case-by-case basis, for example, as to what information to include, whether contextual analysis is executed, whether a network connection is established with the computing device of the user, etc. An exemplary alert may comprise but is not limited to one or more of: a message notification (e.g. user identifying that a user name is called), speech transcription, contextual analysis of spoken utterances, contextual suggestions for spoken utterances, image content, replay of captured audio, live streams/live feed (e.g. useful for pilots, police scanners, emergency services, etc.).

Processing operation 110 may further comprise output of a generated alert. For example, output of an exemplary alert may comprise displaying the alert through a computing device, where the displayed alert provides an indication that the spoken word is identified in the spoken utterances. Generated alerts may be proactively provided to a user when a specific word is detected in spoken utterances. An exemplary application/service may be configured to provide an alert even when a device is not connected to a network connection. However, alerts can be richer and more expansive when additional contextual analysis is executed, for example, using other resources of a distributed service (e.g. offered by a platform). In one example, an exemplary alert may comprise a message notification indicating that a user's name has been called and/or a recording of sound utterances associated with a buffered window. In another instance, an exemplary alert may further comprise a live stream/live feed of audio, which may be useful to provide ongoing context for a given situation. Moreover, an exemplary displayed alert may be accompanied by additional notifications such as a vibration of the computing device and/or an audio alert output through the computing device. This may be useful to assist with grabbing the attention of a user, especially in instances where a user is visually impaired or hearing impaired.

In some examples, output (processing operation 110) of an alert may comprise displaying the alert through an accessory device connected with a computing device. Non-limiting examples of accessory devices comprise but are not limited to: wearable computing devices (e.g. headsets, watches, sensors, etc.), augmented reality (AR) devices, speakers, robots, electronic devices, other processing devices, etc. In some instances, an exemplary alert may be simultaneously provided to a computing device and an accessory device. In one example, a message notification may be output on a display associate with a computing device and an audio output may be provided through an accessory device such as a headset device.

The application/service may be configured to execute decision operation 112, where it is determined whether a computing device is connected to the internet via a network connection. In examples where a computing device is connected to a network connection, flow of method 100 branches YES and processing proceeds to processing operation 114.

At processing operation 114, a buffered window is provided to a distributed speech recognition service, where the buffered window corresponds with an interval of the sounds utterances that is associated with a detection of the spoken word. An exemplary distributed speech recognition service is just an example of a service that may be used to provide further analysis of the sound utterances. Examples of other distributed services include but are not limited to: input recognition services, speech-to-text services, entity identification services, knowledge databases, web search services, intelligent personal assistant services, telemetric analysis services, word processing services, presentation services, notes application services, instant message services, email services and call communication/voice over internet protocol services, among other examples. In examples, additional signal data collected for a device (e.g. geo-locational data, user account data, application usage data, etc.) may also be transmitted to assist with providing contextual analysis of sound utterances associated with the buffered window. One or more exemplary distributed services may analyze content associated with the buffer window and/or other signal data provided by the computing device.

Flow may proceed to processing operation 116, where the computing device (executing the application/service) receives contextual analysis from the distributed speech recognition service (and/or other distributed services). In one instance, analysis by the distributed speech recognition service comprises transcription analysis that converts sound utterances of the buffered window from speech to text. In one example, processing operation 116 may comprise receiving, from the distributed speech recognition service, a live transcription of content in the buffered window. In examples where further contextual analysis is performed, processing operation 116 comprises receiving results of contextual analysis, which may include contextual suggestions to include in an exemplary alert. Contextual suggestions may comprise content in any format (including rich media), where content includes but is not limited to: links, images, text, audio signals, and videos, among other examples. Distributed services such as the distributed service examples mentioned in the foregoing may be utilized for the generation and providing of contextual suggestions, for example, that may be included in exemplary alerts.

In examples where no network connection is established with a computing device, decision operation 112 branches NO and method 100 proceeds to processing operation 118. At processing operation 118, content associated with the buffered window is further analyzed locally by the application/service executing on the computing device. An exemplary application/service may be configured to execute speech-to-text analysis or interface with other applications/services of the computing device to generate a live transcription of content of the buffered window, for example, that corresponds to an interval of the spoken utterances associated with detection of the specific word.

Flow may proceed to processing operation 120, where a live transcription is generated of the content of the buffered window. Processing operation 120 may comprise executing speech-to-text servicing to generate a textual representation of one or more portions of content identified in the buffer window. In some examples, additional processing may occur to further evaluate a generated transcription, for example, to place the transcription in a form that is better suited for presentation to a user. For instance, a generated transcription may misspell or misinterpret certain words, which can be reviewed and corrected before including a version of the transcription in an exemplary alert.

Regardless of whether content of a buffer window is analyzed using resources of a distributed service and/or analyzed locally on a computing device, an exemplary computing device may output (processing operation 122) one or more additional messages (e.g. alerts) for the user. An exemplary message that is output (processing operation 122) may comprise any of: a transcription of content from the sound utterances (e.g. associated with an exemplary buffer window), contextual analysis for the sound utterances, contextual suggestions for the sound utterances to assist a user with taking action, an interval of the sound utterances (e.g. that corresponds with an exemplary buffer window) and a live stream/live feed of sound utterances, among other examples. Output (processing operation 122) may comprise displaying, through the computing device, a message that comprises the live transcription and/or other types of content identified above in the foregoing.

In alternative examples, a plurality of computing devices (connected via network connection) may be utilized to detect recitation of a specific word/name/phase, etc. In examples, processing results from speech detection analysis may be executed on one device, where an exemplary alert is sent to one or more other computing devices. For instance, connected devices may exist in the same location, where one computing device is in closer proximity to a sound source and may be utilized to transmit signals associated with sound utterances to another computing device. In another example, computing devices that synchronize data for speech detection and alerting may be in different locations, where data is transmitted over a network connection. For instance, a user may be in a different conference room than where their name is called, where another computing device, executing an exemplary application/service, may actively detect recitation of a user name and then transmitted to another computing device in a different location. This may be useful to let that user know its name is called in a different location, for example, without requiring the users to take active steps to communicate with another user.

FIGS. 2A and 2B illustrate exemplary processing device views providing examples related to exemplary alerts based on speech detection processing with which aspects of the present disclosure may be practiced. Processing operations for speech detection processing, buffering and generation of exemplary alerts (notifications) are described in at least the foregoing description of method 100 (FIG. 1).

FIG. 2A illustrates processing device view 200, which is a user interface example of an exemplary alert 204 being proactively provided to a user of a computing device 202. In processing device view 200, an exemplary alert 204 is displayed through a display of a computing device 202. For instance, the alert 204 provides a user with an indication that the user's name was called out, for example, in a public place. As described in the foregoing, the exemplary alert 204 may be accompanied by notifications such as vibration or audio alert.

FIG. 2B illustrates processing device view 220, which is another user interface example of an exemplary alert 222 being proactively provided to a user of a computing device 202. Exemplary alert 222 provides an example of a message that comprises a live transcription (e.g. "Coffee for Swetha") of sound utterances captured and processed. In the example shown, the name of the user "Swetha" may be a specific trigger word that is stored in a dynamic grammar file and matched to a spoken utterance. This may trigger proactive generation and output of alert 222. Processing device view 220 may build on the example shown in processing device view 200 (FIG. 2A), where an exemplary alert 222 is a subsequent alert following alert 204 that provides an initial indication that a user's name is called out. In other examples, alert 222 may be considered an initial alert that is proactively provided by an exemplary application/service. In yet another example, an exemplary alert may be customized to provide content from alert 204 and alert 222 in a single message. As described in the foregoing, the exemplary alert 222 may be accompanied by notifications such as vibration or audio alert.

Figure 3:
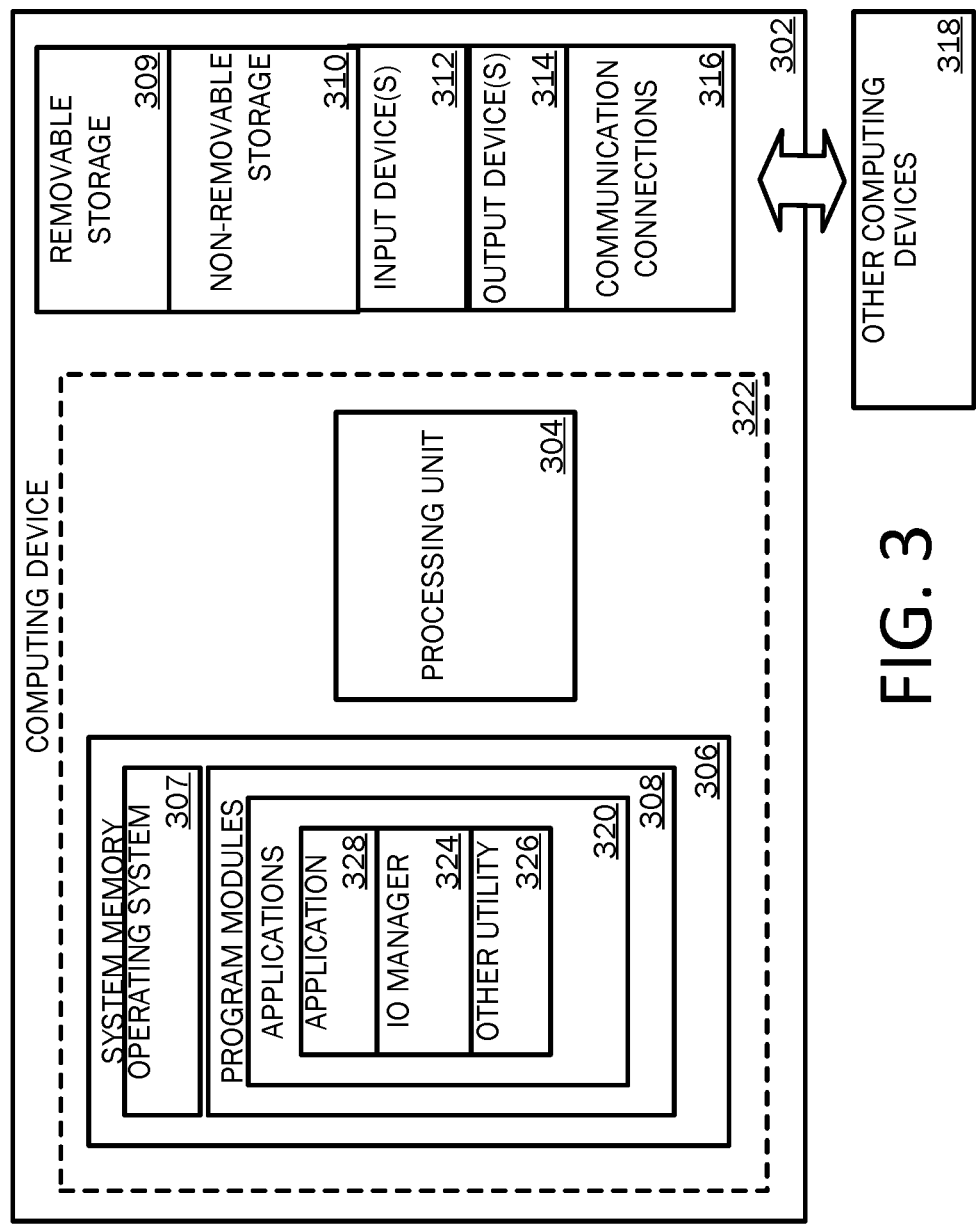
FIG. 3 is a block diagram illustrating an example of a computing device with which aspects of the present disclosure may be practiced.
Figure 4A:
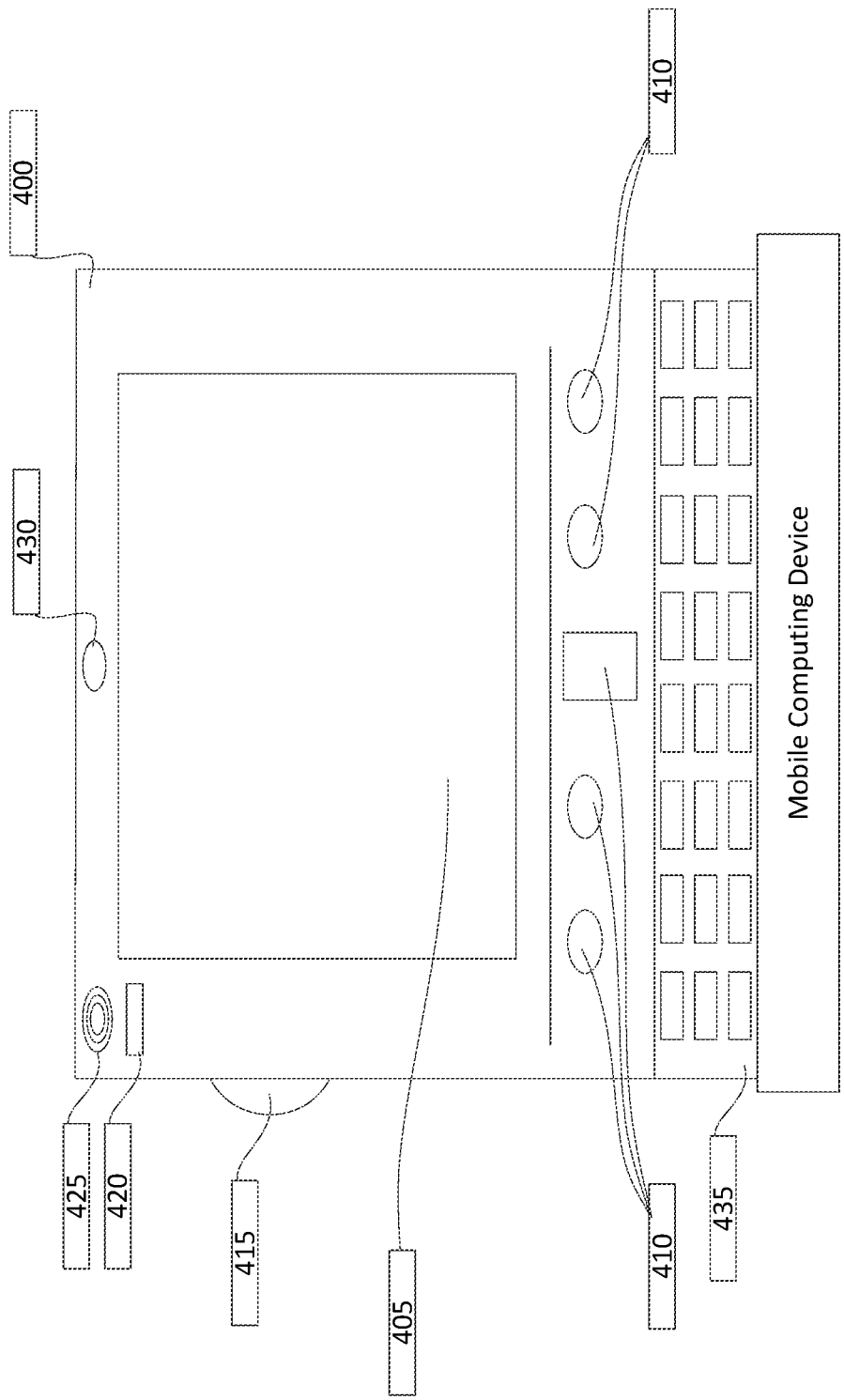
FIGS. 4A and 4B are simplified block diagrams of a mobile computing device with which aspects of the present disclosure may be practiced.
Figure 4B:
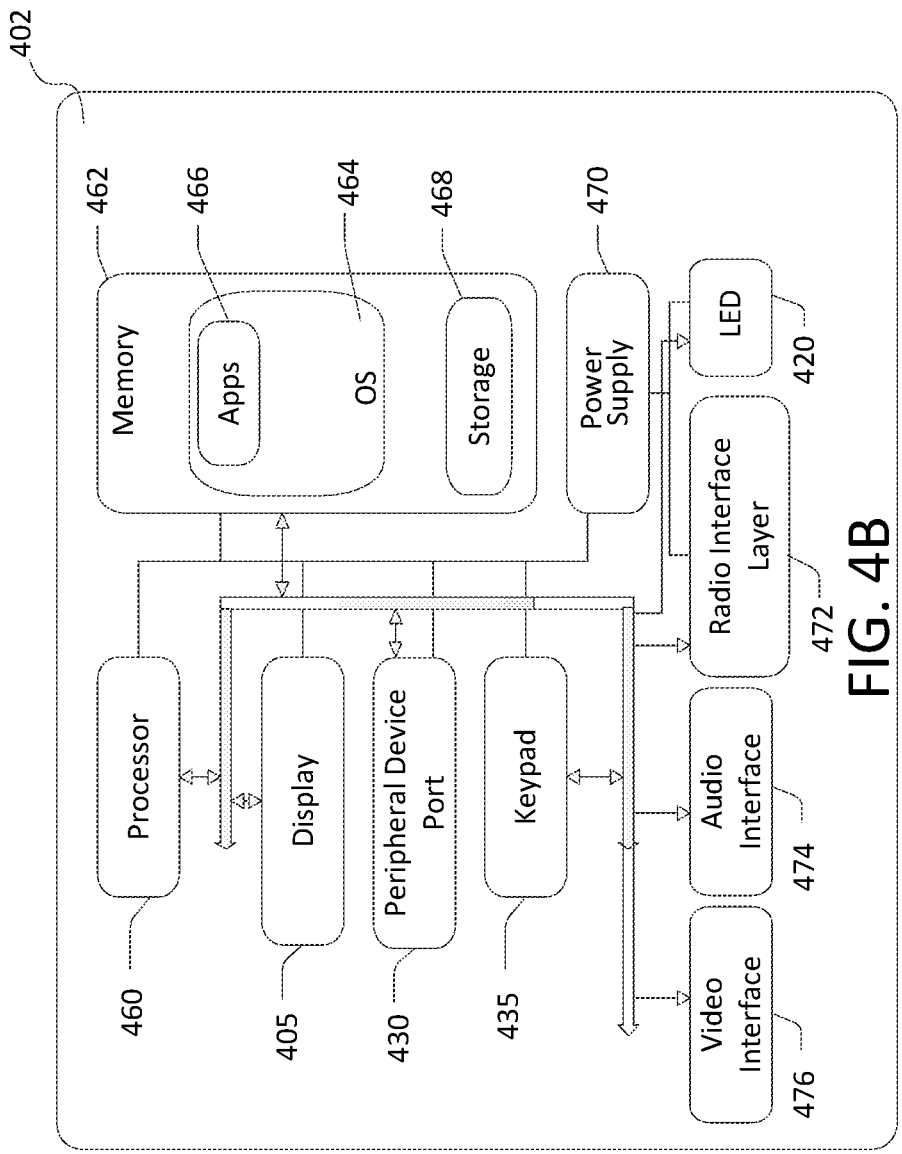
Figure 5:
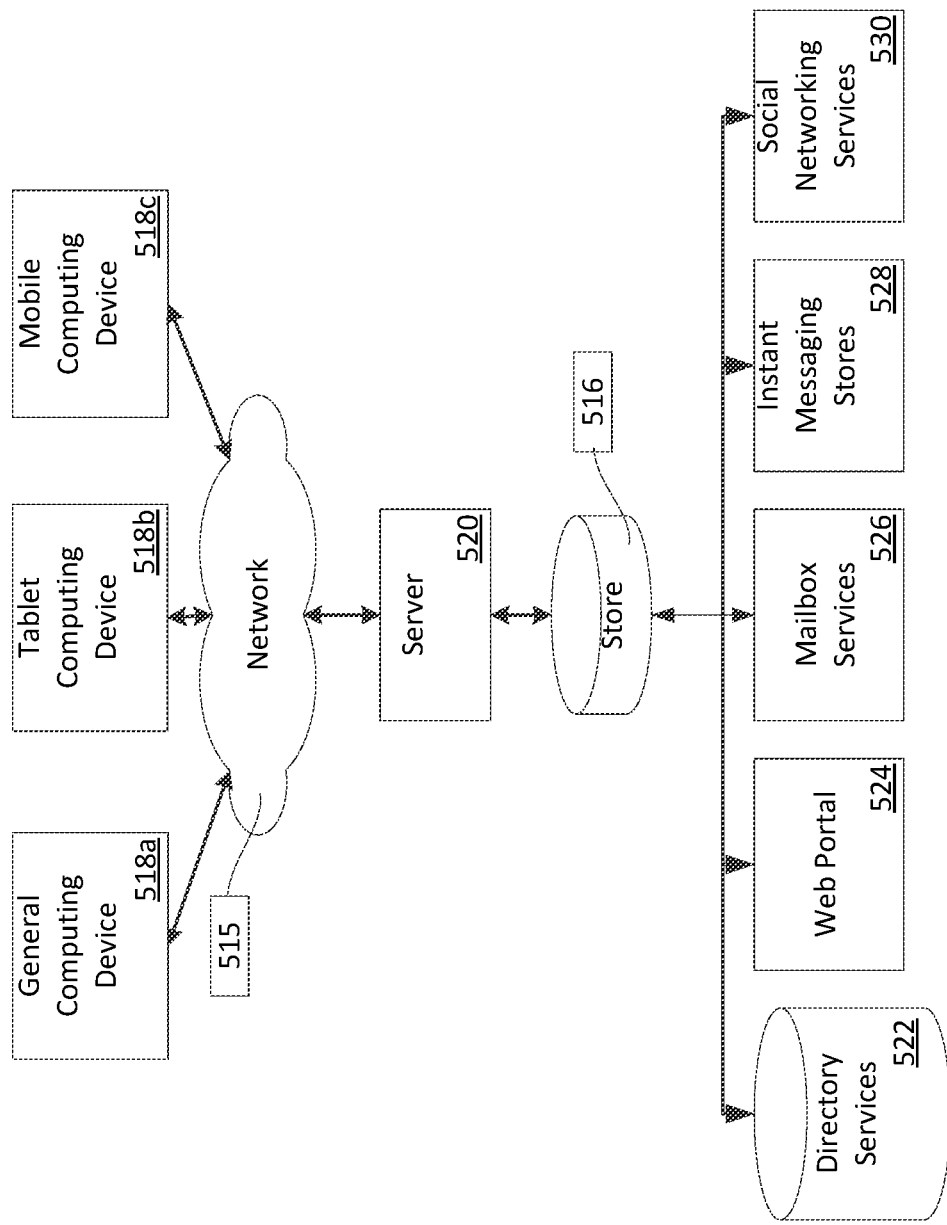
FIG. 5 is a simplified block diagram of a distributed computing system in which aspects of the present disclosure may be practiced.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for processing operations related to speech detection processing and generation and output of exemplary alerts as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 409 and a non-removable storage device 310.

As stated above, a number of program modules and data files may be stored in the system memory 306. While executing on the processing unit 404, program modules 408 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 404 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for processing operations related to speech detection processing and generation and output of exemplary alerts as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for processing operations related to speech detection processing and generation and output of exemplary alerts as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   receiving, through a user computing device, a user input identifying a word for a user-defined grammar file;

dynamically updating the user-defined grammar file to comprise the word;
actively executing, through the computing device, speech detection that analyzes a spoken utterance in association with the user-defined grammar file stored locally on the computing device;
detecting that a spoken word of the spoken utterance matches the word stored in the user-defined grammar file;
generating, based on the detecting, an alert that indicates that the word is identified in the spoken utterance; and
displaying, through the computing device, the alert.

2. The method of claim 1, wherein the speech detection further comprises filtering out non-speech noise and silence from the spoken utterance and buffering the spoken utterance through a moving window buffer that continuously tracks intervals of sound utterances.

3. The method of claim 2, further comprising: providing, to a distributed speech recognition service, a buffered window corresponding with an interval of the sounds utterances that is associated with a detection of the word, receiving, from the distributed speech recognition service, a live transcription of content in the buffered window and displaying, through the computing device, a message that comprises the live transcription.

4. The method of claim 2, further comprising: analyzing, through an application executing on the computing device, a buffered window corresponding with an interval of the sounds utterances that is associated with a detection of the word, generating a live transcription for content of the buffered window, and displaying, through the computing device, a message that comprises the live transcription.

5. The method of claim 1, further comprising: providing a live stream of the spoken utterance in association with the displayed alert.

6. The method of claim 1, further comprising: presenting, in association with the alert, one or more selected from a group consisting of: a vibration of the computing device and an audio alert output through the computing device.

7. The method of claim 1, wherein the receiving of the user input comprises receiving, through a user interface, one or more spoken utterances for the word, and wherein the detecting of a matching between the spoken word and the word stored in the user-defined grammar file comprises matching audio data for the spoken word with audio data of the one or more spoken utterances for the word.

8. The method of claim 7, wherein the receiving of the user input comprises receiving, through a user interface, one or more spoken utterances for the word, and wherein the detecting of a matching between the spoken word and the word stored in the user-defined grammar file comprises matching audio data for the spoken word with audio data of the one or more spoken utterances for the word.

9. A system comprising:
at least one processor; and
a memory, operatively connected with the at least one processor, storing computer-executable instructions that, when executed by the at least one processor, causes the at least one processor to execute a method that comprises:
receiving, through a user computing device, a user input identifying a word for a user-defined grammar file;
dynamically updating the user-defined grammar file to comprise the word;
actively executing, through the computing device, speech detection that analyzes a spoken utterance in association with the user-defined grammar file stored locally on the computing device;
detecting that a spoken word of the spoken utterance matches the word stored in the user-defined grammar file;
generating, based on the detecting, an alert that indicates that the word is identified in the spoken utterance; and
displaying, through the computing device, the alert.

10. The system of claim 9, wherein the speech detection further comprises filtering out non-speech noise and silence from the spoken utterance and buffering the spoken utterance through a moving window buffer that continuously tracks intervals of sound utterances.

11. The system of claim 10, wherein the method, executed by the at least one processor, further comprises: providing, to a distributed speech recognition service, a buffered window corresponding with an interval of the sounds utterances that is associated with a detection of the word, receiving, from the distributed speech recognition service, a live transcription of content in the buffered window and displaying, through the system, a message that comprises the live transcription.

12. The system of claim 10, wherein the method, executed by the at least one processor, further comprises: analyzing a buffered window corresponding with an interval of the sounds utterances that is associated with a detection of the word, generating a live transcription for content of the buffered window, and displaying a message that comprises the live transcription.

13. The system of claim 9, wherein the method, executed by the at least one processor, further comprises: providing a live stream of the spoken utterance in association with the displayed alert.

14. The system of claim 9, wherein the method, executed by the at least one processor, further comprises: presenting, in association with the alert, one or more selected from a group consisting of: a vibration of a component associated with the system and an audio alert output through the system.

15. A computer storage media computer-executable instructions that, when executed by at least one processor, causes the at least one processor to execute a method comprising:
receiving, through a user computing device, a user input identifying a word for a user-defined grammar file;
dynamically updating the user-defined grammar file to comprise the word;
actively executing, through the computing device, speech detection that analyzes a spoken utterance in association with the user-defined grammar file stored locally on the computing device;
detecting that a spoken word of the spoken utterance matches the word stored in the user-defined grammar file;
generating, based on the detecting, an alert that indicates that the word is identified in the spoken utterance; and
displaying, through the computing device, the alert.

16. The computer storage media of claim 15, wherein the speech detection further comprises filtering out non-speech noise and silence from the spoken utterance and buffering the spoken utterance through a moving window buffer that continuously tracks intervals of sound utterances.

17. The computer storage media of claim 16, wherein the executed method further comprising: providing, to a distributed speech recognition service, a buffered window corresponding with an interval of the sounds utterance that is associated with a detection of the word, receiving, from the distributed speech recognition service, a live transcription of content in the buffered window and displaying, through the computing device, a message that comprises the live transcription.

18. The computer storage media of claim 16, wherein the executed method further comprising: analyzing, through an application executing on the computing device, a buffered window corresponding with an interval of the sounds utterances that is associated with a detection of the word, generating a live transcription for content of the buffered window, and displaying a message that comprises the live transcription.

19. The computer storage media of claim 15, wherein the executed method further comprising: providing a live stream of the spoken utterance in association with the displayed alert.

20. The computer storage media of claim 15, wherein the executed method further comprising: presenting, in association with the alert, one or more selected from a group consisting of: a vibration of the computing device and an audio alert output through the computing device.

* * * * *